(12) United States Patent
Høimyr et al.

(10) Patent No.: US 7,559,244 B2
(45) Date of Patent: Jul. 14, 2009

(54) ARRANGEMENT OR PROVISION OF A SENSOR OR PROBE FOR THE MEASURING OF A CONDITION IN A PIPE OR THE LIKE

(75) Inventors: Haakon Høimyr, Rykkinn (NO); Steinar Wighus, Slemmestad (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 11/662,875

(22) PCT Filed: Sep. 9, 2005

(86) PCT No.: PCT/NO2005/000331

§ 371 (c)(1),
(2), (4) Date: Jun. 21, 2007

(87) PCT Pub. No.: WO2006/031124

PCT Pub. Date: Mar. 23, 2006

(65) Prior Publication Data

US 2008/0115583 A1      May 22, 2008

(30) Foreign Application Priority Data

Sep. 17, 2004    (NO) .................................. 20043893

(51) Int. Cl.
*G01L 7/00*   (2006.01)
(52) U.S. Cl. ........................................................ 73/706
(58) Field of Classification Search ........... 73/700–756; 361/283.1–283.4
See application file for complete search history.

(56) References Cited

U.S. PATENT DOCUMENTS

| 4,364,226 | A | 12/1982 | Croset et al. |
| 5,852,244 | A | 12/1998 | Englund et al. |
| 6,000,278 | A | 12/1999 | Hystad |
| 7,197,937 | B2 * | 4/2007 | Amore et al. .................. 73/715 |
| 7,236,252 | B1 * | 6/2007 | Carreiro et al. ............. 356/498 |

FOREIGN PATENT DOCUMENTS

| DE | 198 06 440 | 8/1999 |
| GB | 2 058 360 | 4/1981 |
| JP | 2003-020973 | 1/2003 |
| WO | 97/15814 | 5/1997 |

* cited by examiner

*Primary Examiner*—Andre J Allen
*Assistant Examiner*—Jermaine Jenkins
(74) *Attorney, Agent, or Firm*—Wenderoth, Lind & Ponack, L.L.P.

(57) ABSTRACT

An arrangement or provision of a sensor or probe (11) for the measuring of a physical or chemical condition such as pressure, temperature or corrosion in a pipe (1, 2), tank or tubular container being provided with a connection such as a flange connection (3,4) between the pipe, tank or tubular sections. The sensor or probe (11) is provided in conjunction with a gasket such as a ring gasket (8) which is used as a seal between the pipe (1, 2), tank or tubular sections. The probe or sensor element is provided on an inner face of the ring gasket facing the inside of the pipe, tank or tubular sections. Electrical connectors (16) for transforming signals from the probe or sensor element (11) are provided in a bore or bores (14) that stretches from the sensor or probe and through the gasket or ring gasket (8) and to the outside of the gasket.

4 Claims, 7 Drawing Sheets

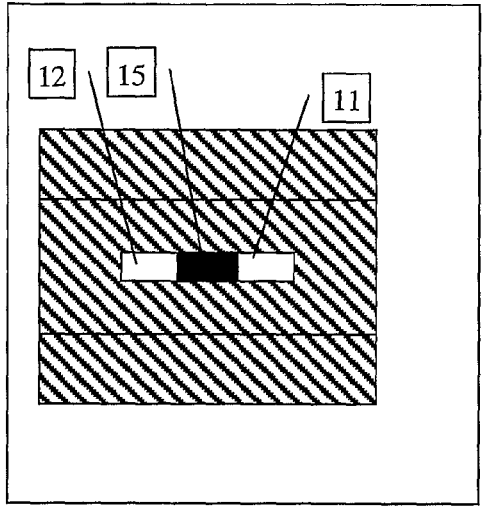
Figure 3a, Gasket details
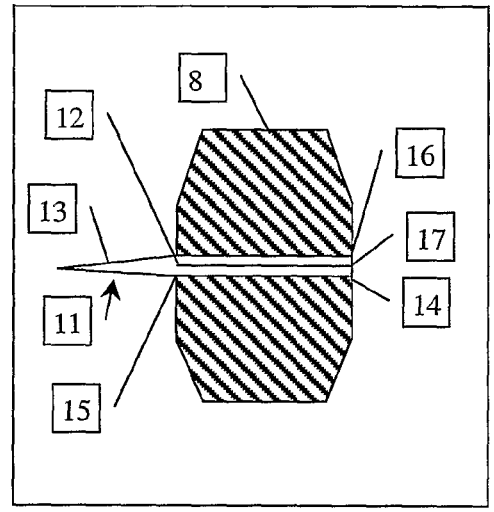
Figure 3b, Gasket details
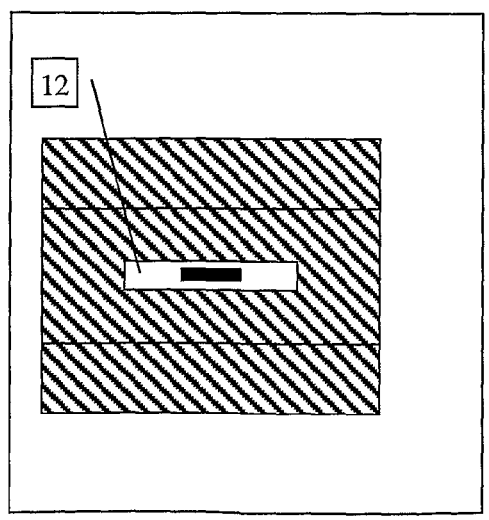
Figure 4a, Gasket details
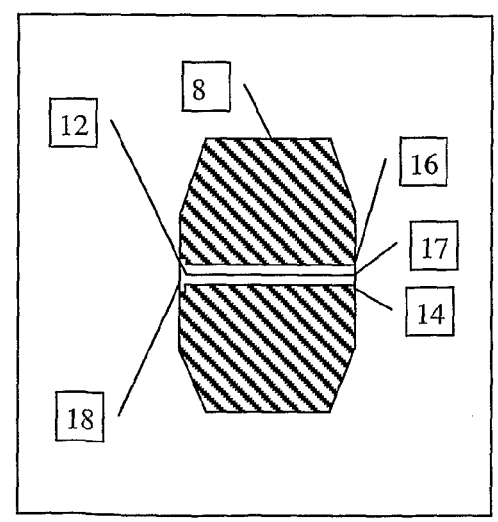
Figure 4b, Gasket details

ARRANGEMENT OR PROVISION OF A SENSOR OR PROBE FOR THE MEASURING OF A CONDITION IN A PIPE OR THE LIKE

BACKGROUND OF THE INVENTION

1. Technical Field of the Invention

The present invention relates to an arrangement or provision of a sensor or probe for the measuring of a physical or chemical condition such as pressure, temperature or corrosion in a pipe, tank or tubular container being provided with a connection such as a flange connection in a pipe, tank or tubular sections of which the pipe, tank or container is made.

2. Description of the Related Art

Sensors and probes of the above kind are commonly used in the process industry to enable detection, surveillance and control of the conditions in a fluid flow or process. Such probes or sensors are usually intrusive as they are provided on a separate measuring head that stretches through a hole or bore in the wall of the pipe, tank or container and is attached thereto by means of a screw thread or weld connection.

A major disadvantage with such known solutions is that the wall, in which the sensor or probe is provided, has a reduction in strength due to the hole made in it (the hole represents a weakening point in the wall). Further, any welded connection reduces the strength of the material in the wall. The intrusive probe or sensor represents an additional source of leakage and is expensive to produce and install.

DE A1 198 06 440 shows and describes a through flow measuring device (orifice) for the measuring of the quantity of fluid passing through a pipe where the measuring device, in the form of an orifice flow meter with gauges, is provided on a separate ring element with a diameter corresponding to the pipe and which is provided to be attached between flanges on the pipe with a separate gasket element therebetween. This known solution is expensive since a separate ring is made to hold the measuring device and gauges.

SUMMARY OF THE INVENTION

With the present invention is provided a solution for the arrangement or provision of a probe or sensor which preferably utilizes the existing packing or gasket in a connection such as a flange connection in a pipe, tank or tubular sections of which the pipe, tank or container is made.

The invention is characterized in that the sensor or probe is provided in conjunction with a gasket or packing ring that is used as a seal between the pipe, tank or tubular sections. The probe or sensor element is provided on the inner face if the ring facing the inside of the pipe, tank or tubular sections, and electrical connectors transforming signals from the probe or sensor element are provided in a bore or bores that stretches from the sensor or probe and through the gasket or packing ring and to the outside of the ring.

BRIEF DESCRIPTION OF THE DRAWINGS

The present invention will be described in further detail in the following by means of examples and with reference to the attached drawings, where:

FIGS. 3a and 3b show enlarged views of the gasket as such with the sensor as shown in FIGS. 1 and 2, seen from an inner side (the wall on the inside) of the gasket in FIG. 3a and in cross section in FIG. 3b;

FIGS. 4a and 4b show an alternative embodiment of a sensor, seen from the inner side (the wall on the inside) of the gasket in FIG. 4a and in cross section in FIG. 4b;

DETAILED DESCRIPTION OF THE INVENTION

Figure 1:
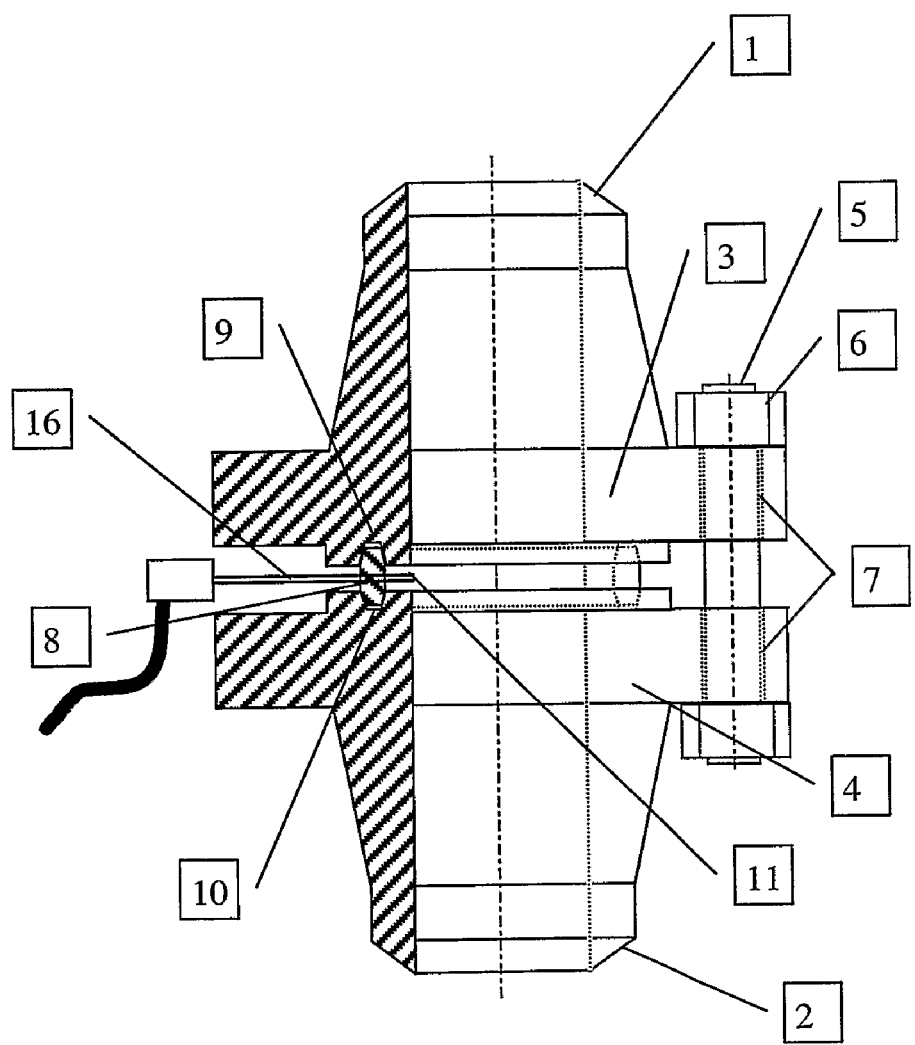
FIG. 1 shows in cross section a pipe flange connection with a ring gasket in which a sensor according to the present invention is provided.
Figure 2:
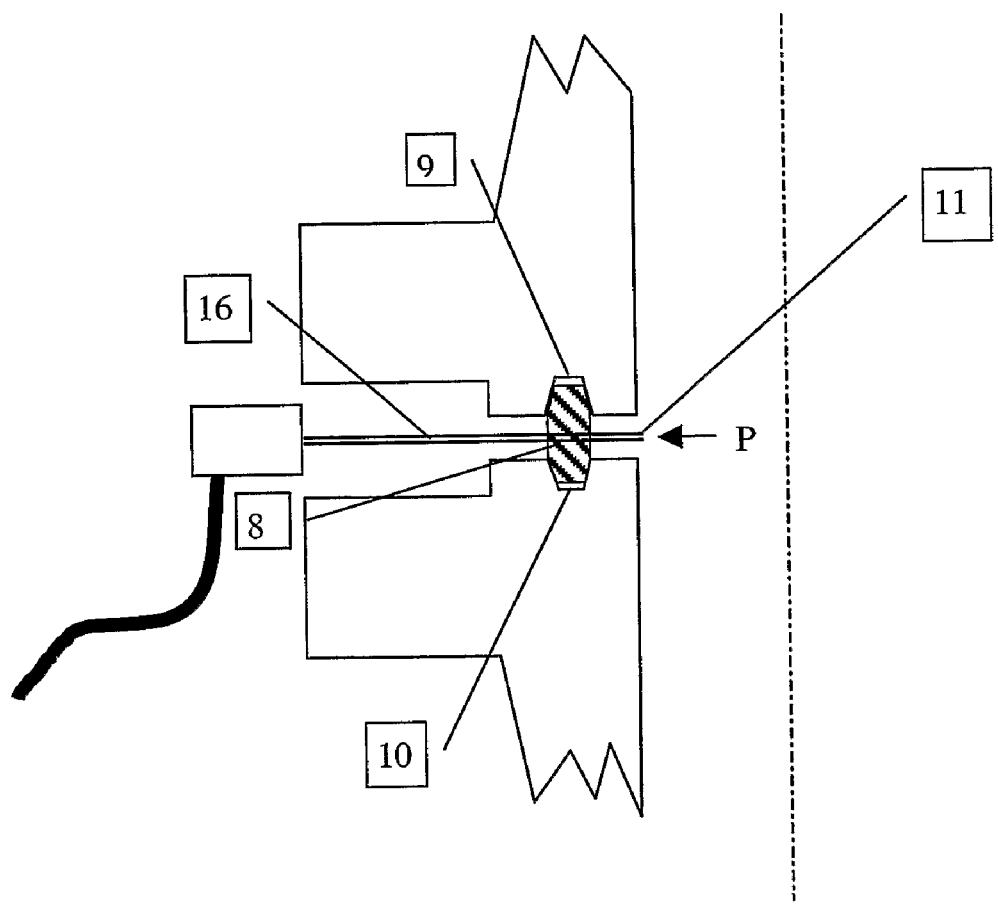
FIG. 2 shows an enlarged cross sectional view of the left hand side of the flange connection shown in FIG. 1.

FIGS. 1 and 2 show, as stated above, a flange connection between two pipe ends 1 and 2. The flanges 3, 4 are held tightly together by means of bolts 5 and nuts 6 provided in through going holes 7 in the flanges. A ring gasket 8 is provided between the flanges in grooves 9, 10 in the respective flanges 3, 4 to obtain a tight seal between the two flanges. The major inventive feature according to the present application is the arrangement or provision of a sensor 11 in the gasket 8. The sensor could be any type of element measuring pressure, temperature, change of electrical conductivity or resistivity due to corrosion or erosion of the sensor element.

FIG. 3a and FIG. 3b show, in enlarged scale, the gasket 8 as such with the sensor as shown in FIGS. 1 and 2, seen from the inner side (the wall on the inside) of the gasket in FIG. 3a and in cross section in FIG. 3b. The sensor element is a two-sided membrane pressure element which is provided in a longitudinal recess 12 on the inside of the gasket on the inwardly facing wall of the gasket, and where the hollow space between the V-shaped (two-sided) membrane element sides is filled with oil or other suitable fluid. A sensor element 15, suitably a piezoelectric crystal, is provided at the bottom side of the recess 12, and electrical conductors 16 connected with this sensor element 15 are provided in a bore 14 stretching through the gasket 8. The space between the electrical conductors and bore is sealed off by glass insulation or other suitable material.

The sensor, with reference to FIGS. 1-3, works in the following way: A pressure inside the pipe 1, 2 will act on the V-shaped membrane 11, and the pressure in the fluid inside the membrane will rise acting on the sensor element 15 which in turn generates an electric signal that is conducted via the conductors 16 to a sensing and measuring device (not shown). The V-shaped, two-sided membrane is quite sensitive due to the large membrane area. In this connection it should be noted that the membrane could stretch all the way around the gasket, 360° to further increase its pressure sensitivity.

FIG. 4a and FIG. 4b show another embodiment of an alternative sensor where the features related to the design and function of the sensor are the same as in the previous figures, but where sensor element 15 is integrated directly in the wall of the gasket 8 and where the membrane 18 is flat and provided on the inner wall of the gasket. This solution is less pressure sensitive than the above V-shape membrane due to the stiffness of the membrane and the short distance between the long sides of the recess 12 which the membrane is covering.

The membrane material may be made of any suitable material such as Inconel® 625 or AISI 316, but, depending on the environment in which the sensor is applied, other materials such as silicon rubber may also be used.

Figure 5:
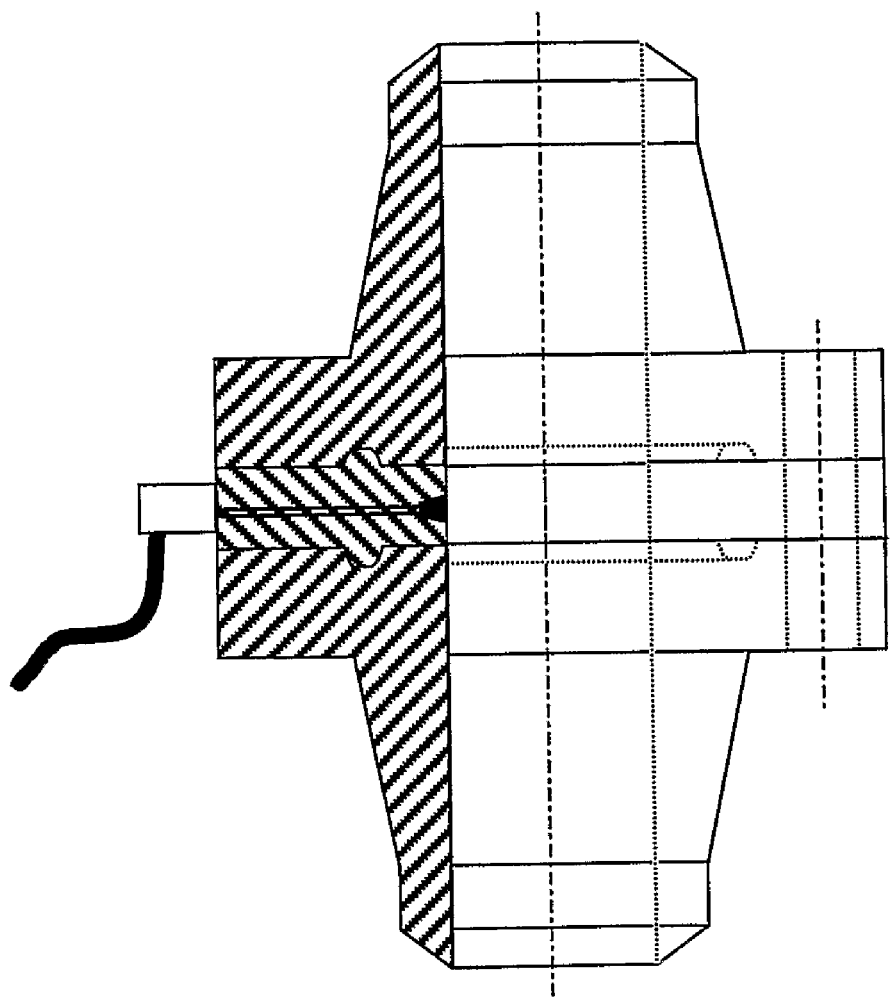
FIGS. 5-7 show different types of flanges where a sensor according to the present invention is used.
Figure 6:
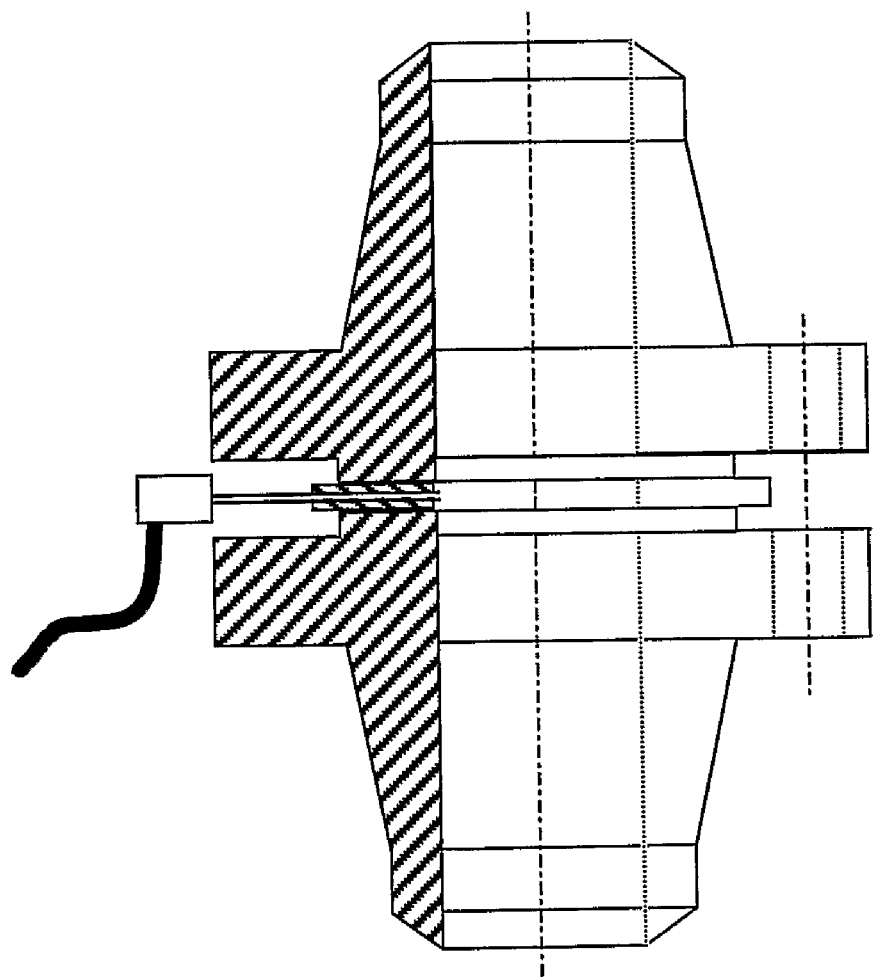
Figure 7:
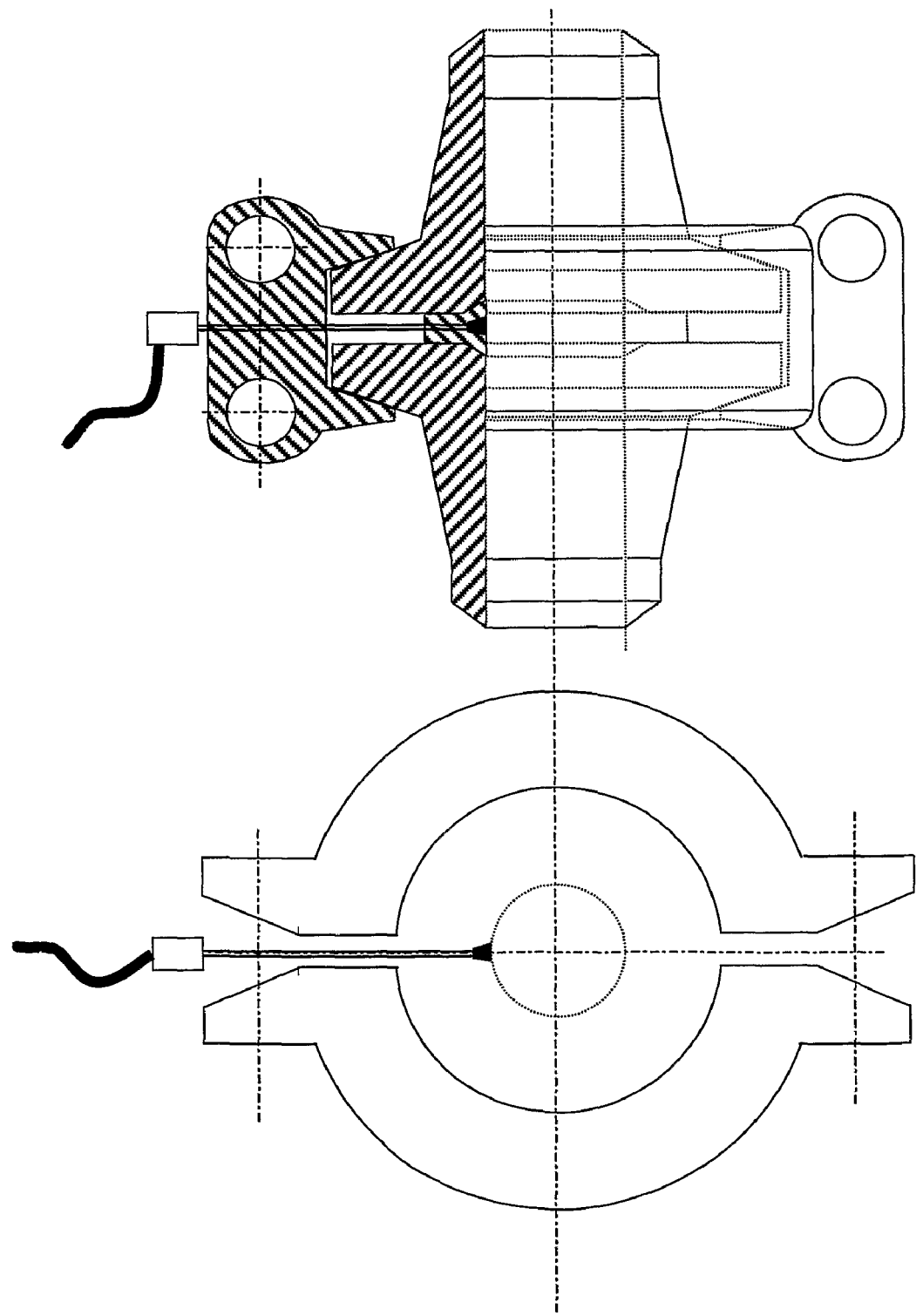

The invention as defined in the claims may not only be applied for RTJ flanges as described above, but may also be adapted to and used on other types of flanges and joints such as compact flanges as shown in FIG. 5, RF flanges as shown in FIG. 6 and mechanical joints as shown in FIG. 7.

Figure 8:
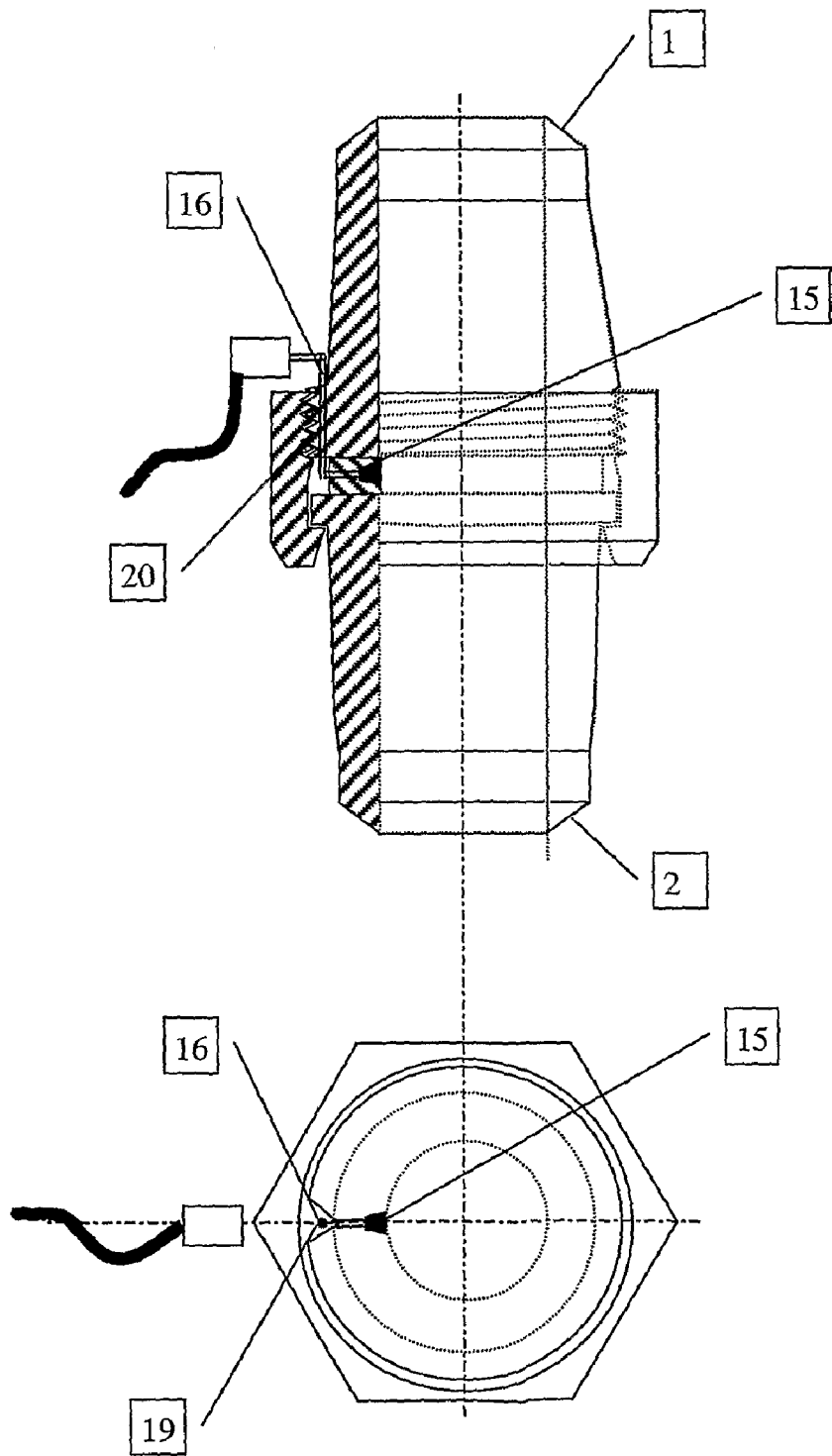
FIG. 8 shows another type of pipe connection where a sensor according to the present invention is used.

The invention may as well be used on other types of pipe connections such as seat union connections as shown in FIG. 8. The electrical conductors 16 leading from the sensor element 15 are in this example provided in a longitudinal recess 19 in the external threads 20 on the pipe end 1.

In fact the present invention may be used in any type of pipe connection where a gasket is or may be used between the pipe ends of the subject connection and which enables the electrical conductors to be lead or arranged from the sensor to the outside of the connection. It is a prerequisite, however, that the gasket is made of a suitable material enabling the sensor(s) to be provided in or within it.

The invention claimed is:

1. An arrangement for measuring of a physical or chemical condition such as pressure, temperature or corrosion in a pipe, tank or tubular container provided with a flange connection between sections of the pipe, tank or tubular container, the arrangement comprising:
    a ring gasket for providing a seal between the pipe, tank or tubular container sections;
    a sensor or probe element provided in conjunction with the ring gasket, wherein the probe or sensor element is provided in conjunction with an inner face of the gasket ring facing an inside of the pipe, tank or tubular sections; and
    a plurality of electrical connectors for transforming signals from the probe or sensor element, the electrical connectors being provided in a bore that extends from the sensor or probe element and through the ring gasket and to the outside of the ring gasket,
    wherein the probe or sensor element is adapted to measure pressure, and the probe or sensor element is a capacitive or piezo-resistive element provided in a recess formed in the gasket, and the recess is filled with a fluid, and the recess is sealably covered by a membrane.

2. An arrangement according to claim 1, wherein the membrane has a two-sided, V-shape form.

3. An arrangement according to claim 1, the membrane is flat and basically fluctuating with the inner wall of the gasket ring.

4. An arrangement according to claim 1, wherein the membrane is welded to the inner ring gasket wall.

\* \* \* \* \*